Aug. 2, 1938.  B. MARTINS  2,125,512
WHEEL SUSPENSION
Filed Dec. 30, 1935  4 Sheets-Sheet 1
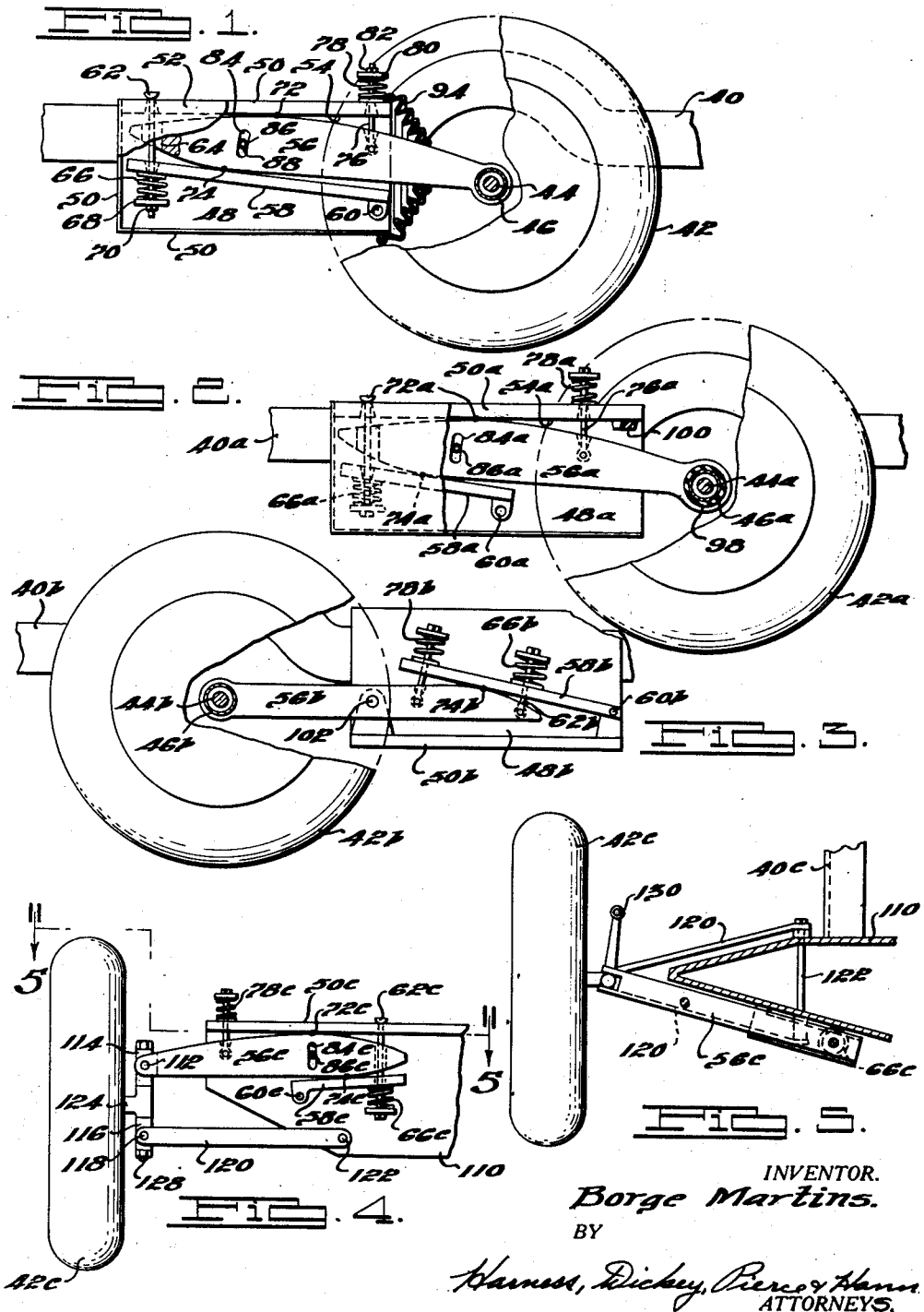
INVENTOR.
Borge Martins.
BY
Harness, Dickey, Pierce & Hann
ATTORNEYS.

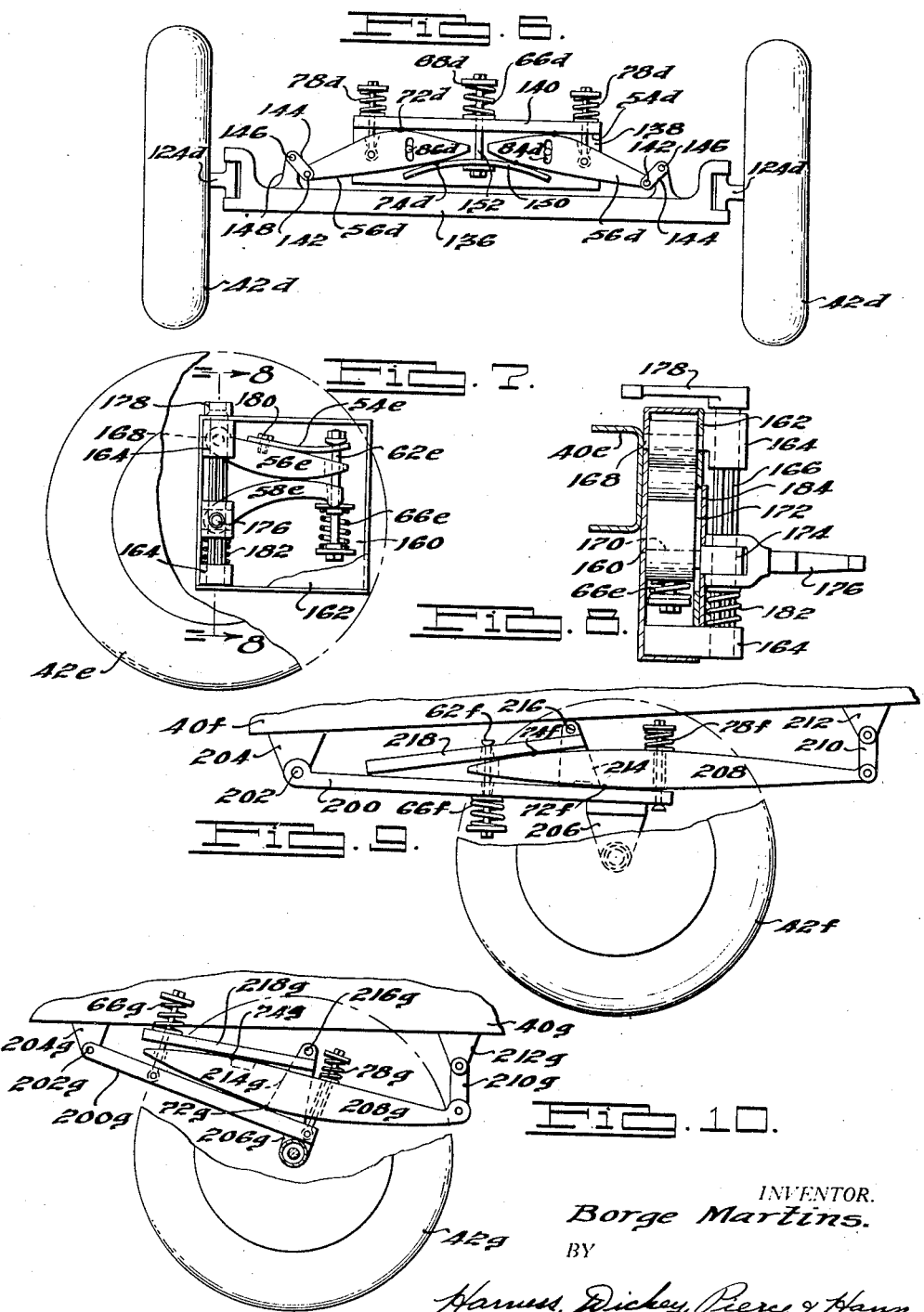

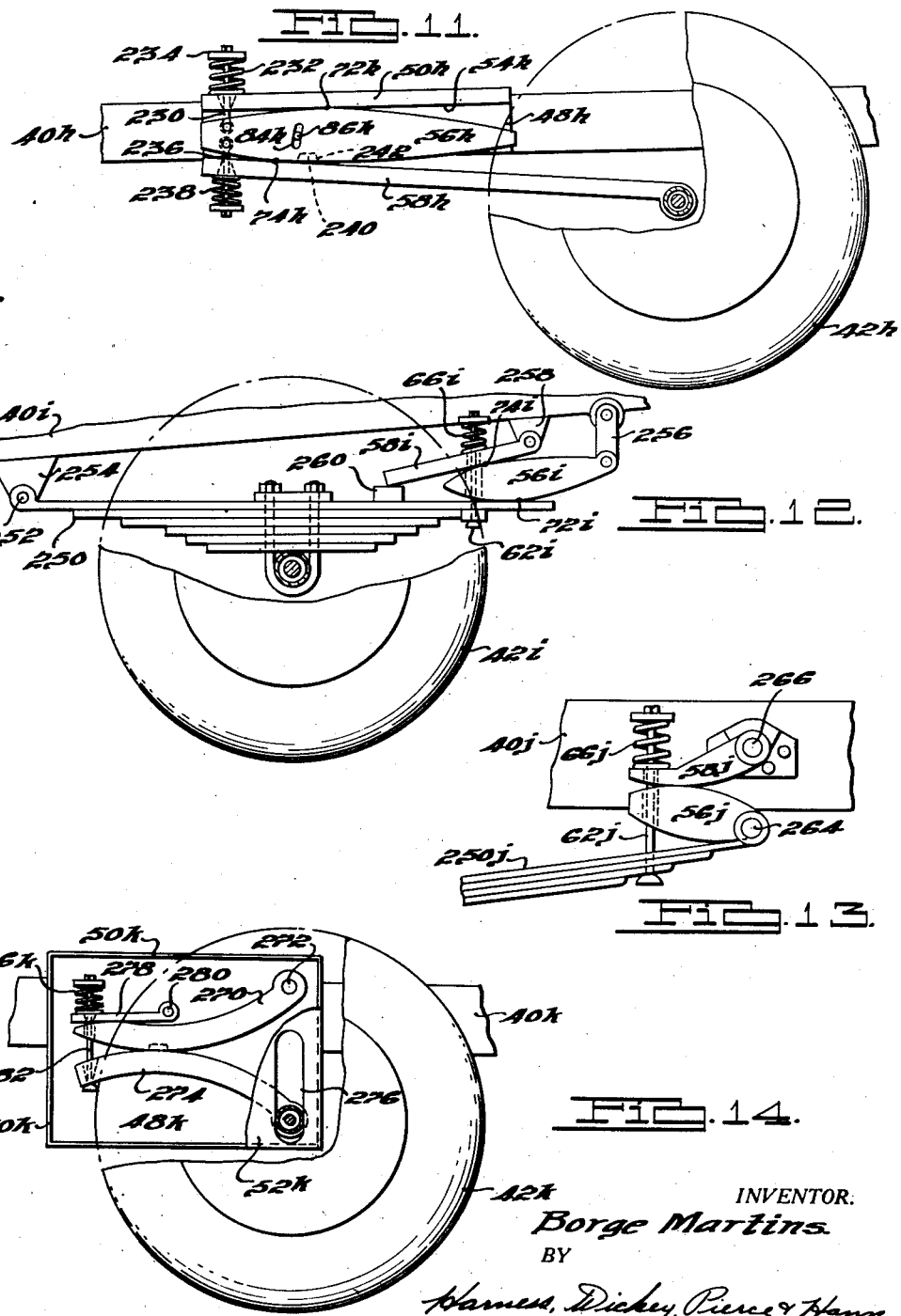

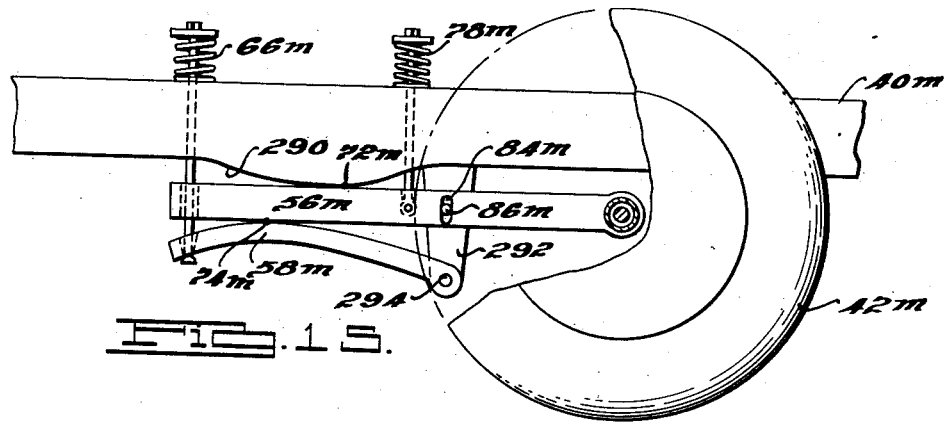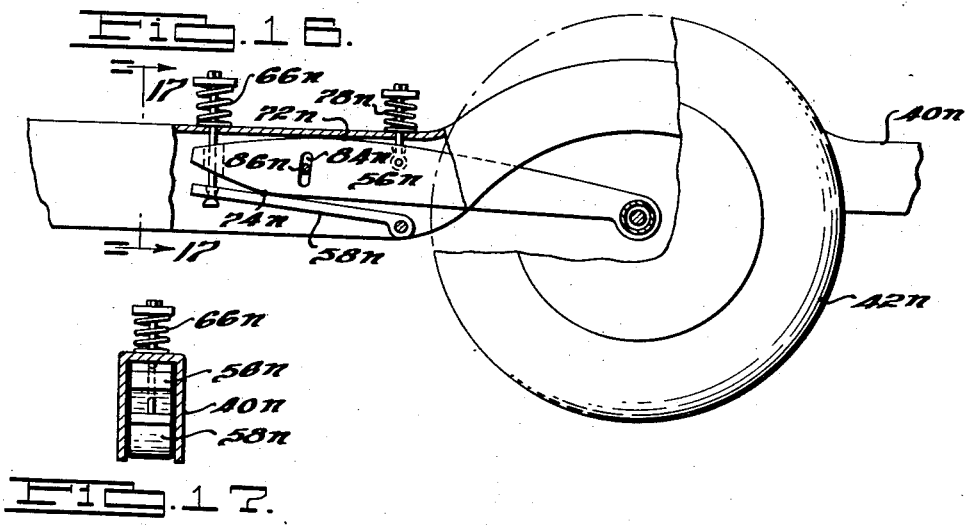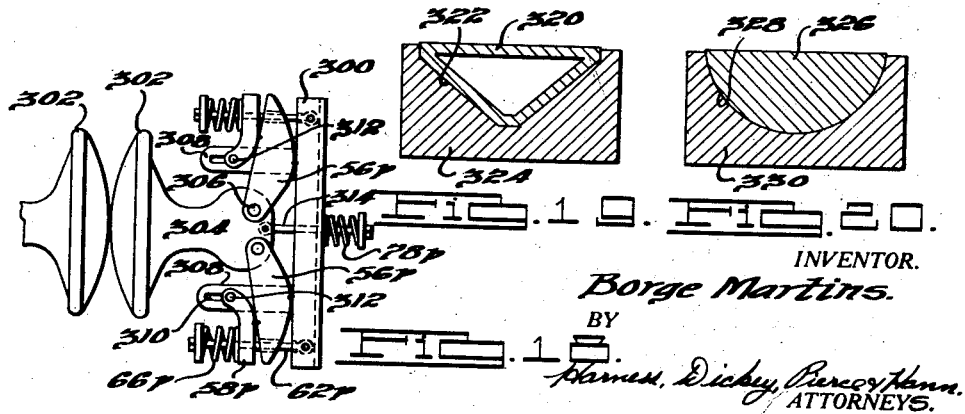

Patented Aug. 2, 1938

2,125,512

UNITED STATES PATENT OFFICE 2,125,512

WHEEL SUSPENSION

Børge Martins, Copenhagen, Denmark

Application December 30, 1935, Serial No. 56,685
In Denmark September 25, 1935

10 Claims. (Cl. 267—20)

This invention relates to a resilient connection between a pair of relatively movable parts or members and, although in the broader aspects of the invention it is applicable to a great variety of uses, it is particularly applicable for use in connection with wheel suspensions for motor vehicles and the like. Accordingly, although the following specification deals almost exclusively with the application of the invention to wheel suspensions for motor vehicles, its application to other uses will be readily understood by those skilled in the art.

Objects of the invention include the provision of a construction for resiliently connecting a pair of relatively movable parts in such a manner as to permit a maximum amount of movement of the parts with a minimum amount of movement of the resisting spring means; the provision of a structure for yieldably connecting a pair of movable parts so constructed and arranged as to be capable of handling a wide variety of loads thereon and still function properly regardless of the amount of such loads within reasonable limits; the provision of a structure as above described which may be used either by itself or in conjunction with other yieldable or resilient elements in yieldably connecting a pair of relatively movable parts together; and the provision of a construction as above described that is simple in construction, efficient in operation and economical to produce.

Other objects include the provision of means for resiliently interconnecting a pair of relatively movable parts so as to constantly urge them toward one limit of their relative movable positions including a pair of relatively rockable members secured to said relatively movable parts respectively and a third member rockably associated with at least one of the first two mentioned members and spring pressed toward a position whereby to urge the first two mentioned members toward one limit of their rockable positions; the provision of a construction as above described in which one of said members is fixed with respect to one of said parts; the provision of a construction as above described in which one of said members is pivoted with respect to the other of said parts; the provision of a construction as above described in which one of said members is rockably associated with both the other of said members; and the provision of a construction as above described in which one of said members is in itself a spring member.

Further objects of the invention include a wheel suspension for motor vehicles and the like including a member secured to a wheel and rockably associated with the frame of the vehicle or part fixed with respect thereto, and a second member rockably associated with the first mentioned member and constantly urged toward a position tending to rock the first mentioned member toward one limit of its rockable position relative to said frame; the provision of a construction as above described in which means are provided for guiding the relative movement between said members along a predetermined path; the provision of a construction as above described in which one of said members is resiliently supported with respect to one of said parts; the provision of a construction as above described in which means are provided for protecting the relatively movable parts against contact with foreign material; the provision of a construction as above described in which the frame of the vehicle is formed to provide an enclosing housing for said parts; and the provision of a construction as above described that is applicable to and removable from a motor vehicle as a unit.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention, and in which like numerals refer to like parts throughout the several different views, Fig. 1 is a fragmentary, partially broken, more or less diagrammatic side elevational view of a vehicle wheel suspension structure embodying the principles of the present invention, the relatively rockable members being disposed longitudinally of the vehicle.

Fig. 2 is a view similar to Fig. 1 but illustrating the employment of a rubber connection between one of the rockable members and its relatively movable part;

Fig. 3 is a view similar to Figs. 1 and 2 but illustrating a modified form of construction;

Fig. 4 is a fragmentary, more or less diagrammatic view illustrating the application of the present invention to the front or steering wheels of a motor vehicle, the relatively rockable members being disposed transversely with respect to the longitudinal axis of the vehicle, and providing an independent suspension for each of the front wheels.

Fig. 5 is a horizontal, sectional view taken on the line 5—5 of Fig. 4;

Fig. 6 is a front elevational view of an adaptation of the present invention to the front or steering wheels of a motor vehicle in which an axle is employed between the front wheels;

Fig. 7 is a more or less diagrammatic, partially broken side elevational view of a further adaptation of the present invention to an independent suspension of the front or steering wheels of a motor vehicle;

Fig. 8 is a transverse, vertical sectional view taken on the line 8—8 of Fig. 7;

Figs. 9, 10 and 11 are views similar to Fig. 1 but illustrating modified forms of construction;

Fig. 12 is a fragmentary, partially broken, more or less diagrammatic side elevational view of a vehicle wheel suspension for either steering or non-steering wheels in which the invention is employed in combination with the usual type of leaf spring now commonly employed for vehicle suspensions;

Fig. 13 is a fragmentary, side elevational view illustrating a modification of the construction shown in Fig. 12;

Figs. 14, 15 and 16 are fragmentary, partially broken, more or less diagrammatic, side elevational views of further adaptations of the present invention to the support of the non-steering wheels of a motor vehicle;

Fig. 17 is a vertical sectional view taken on the line 17—17 of Fig. 16;

Fig. 18 is a side elevational view of a buffer for railway vehicles and the like, illustrating the application of the present invention thereto; and Figs. 19 and 20 are transverse sectional views through cooperating rockable members such as the members employed in any of the previously mentioned views and illustrating modified forms of the rockably engaging or bearing surfaces thereof.

As previously mentioned the present invention relates to yieldable connections between two relatively movable parts and while its range of application is relatively wide in that it may be employed in almost any connection wherein it is desired to resiliently resist relative movement between two relatively movable parts, it is particularly applicable for use in connection with wheel suspensions of motor vehicles. In this connection it forms an improvement over the construction shown and described in my copending application for Letters Patent of the United States filed May 31, 1935, for improvements in Wheel suspensions for motor vehicles or the like, and serially numbered 24,323. While the construction shown in my previous application above referred to is satisfactory in operation and includes many desirable features, it has certain limitations which the present invention overcomes. For instance my prior construction necessitated the use of a relatively long coiled spring to obtain the desired degree of relative movement between the connected parts, and where a sufficiently long spring was employed its bulk provided a problem of accommodation particularly in connection with the application of the structure to motor vehicles. Also, in my prior construction, if a spring of sufficient length was not employed, the resistance to relative movement between the parts increased out of proportion to the increase in load tending to move the parts relative to each other which also created an undesirable condition. The present invention, as in the case of my copending application for Letters Patent of the United States for improvements in Wheel suspensions, filed December 16, 1935 and serially numbered 54,636, is adapted to overcome the disadvantages of my copending application first referred to above, but the means by which this is accomplished in the second mentioned copending application involves a structure considerably different in appearance and action from the structure involved herein, although substantially the same end is obtained.

In accordance with the present invention the two relatively movable parts which are to be resiliently connected to one another are each provided with a member, which members are rockably associated with one another, and a third member which is rockably associated with one of the first two mentioned members, and spring means are employed constantly urging two of the members toward a predetermined limit of their relatively rockable positions thereby to cause them to so react upon the remaining member as to urge it toward one limit of its rockable position relative to the other two members and thereby urge the relative movable parts toward one limit of their relatively movable positions. In the broader aspects of the present invention the rockable relation of one of the members with respect to another thereof may be a more or less pivotal relation, but preferably is a true rocking relation in which the line of contact between the two members constantly changes along the length thereof during rocking movement of one of the members in one direction.

In view of the fact that in the preferred embodiment of the present invention one of the members is rockably associated on opposite faces with the other two members and consequently its line of contact with said other two members varies with respect to both of them during relative movement between the relatively movable parts, advantage may be taken of this fact by so curving the associated faces of all of the members that the resulting rocking movement between said two of said members is relatively small without limiting the desired maximum amount of movement of the third member, this permitting the use of relatively short and compact coil springs or compact springs of other nature to provide the necessary and desirable yieldable resistance to the movement between the members. At the same time the double rocking action of one of the members with respect to the other two members permits a relatively wide variation in the curvature between the various members to obtain the desired amount of relative movement between the parts in accordance with the increase or decrease of the load acting between them. In other words, as will be apparent to those skilled in the art, once the teachings of the present invention are made known to them, a structure may be designed in accordance with the present invention in which equal increments of load added to or subtracted from the relatively movable parts will effect equal amounts of movement of said parts to or from each other or, where desirable, the amount of movement between the parts may vary either one way or the other as additional increments of loads are applied to or subtracted from the parts.

Because of the fact that a device may be constructed in accordance with the present invention to adjust itself to properly but still freely resist relative movement between the connected parts over relatively wide range of loads acting between the parts and to readily yield upon slight variations in load without unduly stressing the cooperating spring means, it will be understood that the invention is particularly adapted for use as a wheel suspension for motor vehicles of the truck or load carrying type. This is for the reason that, in accordance with conventional practice, the conventional multi-leaf springs are designed to accommodate the maximum load which the truck is designed to carry with the result that with no load or partial load conditions, the springs serve little if any use and their rigidity is such as to subject the chassis and all parts carried thereby to violent shocks and vibrations detrimental to the mechanism of the vehicle. The same effect is, of course, apparent in passenger carrying types of motor vehicles although usually to a smaller degree because of the smaller variation in loads normally carried thereby.

In contrast to conventional wheel suspensions, the present invention provides a wheel suspension which is readily yieldable under all conditions of loads so as to readily absorb the shocks which would otherwise be transmitted from the road surface to the vehicle chassis regardless of the condition or magnitude of the load thereon within reasonable but relatively wide limits. Because of this construction and arrangement, it is particularly adaptable to motor vehicles of all descriptions for the reason that irregularities in the road surface act on a motor vehicle traveling thereover in much the same way as variations in the load of a vehicle would act as regards the wheel suspension means thereof and, accordingly, the construction provided by the present invention in being readily yieldable to large variations in load, is likewise yieldable to a greater extent than conventional spring structures for wheel suspension purpose and for that reason is capable of accommodating itself to relatively great irregularities in road surface conditions without causing a movement of the vehicle chassis or parts carried thereby commensurate with those obtained by the use of conventional wheel suspension means.

In the following specification, the explanation of the present invention will be limited almost entirely to the application of the same to wheel suspensions for motor vehicles, this being merely illustrative of its general use and because it perhaps offers the widest field of use for the present invention, but once the teachings of the present invention are made known to those skilled in the art, its application to innumerable other fields will be readily understood.

Referring to the drawings and particularly to Fig. 1 thereof an automobile chassis frame side member is indicated at 40 and as being provided with a cooperating road wheel 42, the road wheel 42 being connected to a driving axle or jack shaft such as 44 carried within a conventional tubular axle housing 46 in accordance with conventional practice. The frame 40 is kicked up over the axle housing 46 also in accordance with conventional practice. Suitably fixed to the frame 40 in advance of the wheel 42 is a plate-like member 48 with the plane of its thickness disposed vertically and parallel to the length of the frame side member 40. Along its upper, forward and lower edges the plate member 48 is provided with a laterally extending flange 50. A cover member 52 commensurate in area with the plate 48 is removably secured to the outer edges of the flanges 50 and serves with the plate 48 and flanges 50 to form a box-like structure in which the main working parts of the mechanism are preferably disposed. The upper flange 50 is preferably made thicker than the flanges 50 at the front and bottom and its under surface 54 is adapted to serve as a track for the rocker member 56.

The rocker member 56 is an elongated structural member arranged with its length parallel to the plane of thickness of the plate 48 and with the major portion thereof enclosed within the box-like structure formed by the plate 48, flanges 50 and cover 52. The rear end of the rocker 56 projects out through the open rear end of this box-like structure and is suitably fixed to the axle housing 46. The rocker 56 in the construction shown in Fig. 1 is curved as viewed in side elevation both on its upper and lower surfaces and the upper surface thereof contacts the track 54 formed on the underside of the upper flange 50. A second elongated structural member 58 is preferably wholly positioned within the box-like structure referred to below the rocker 56 and is mounted therein for pivotal movement about the pin 60 located at the rearward end thereof and mounted in the sides of the box-like structure. A bolt 62 projects downwardly through the upper flange 50, through an enlarged opening 64 in the forward end of the rocker 56 in which it has ample clearance, and through the forward end of the member 58 below which it projects. Surrounding such projecting end of the bolt 62 is a coiled spring 66 constantly maintained under compression between the end of the member 58 and a washer 68 surrounding the lower end of the bolt 62 and adjustably positioned thereon by means of a nut 70. The openings through which the bolt 62 extends in the upper flange 50 and in the member 58 are suitably flared as indicated to permit the necessary swiveling action of the bolt with respect to these members in operation.

The positions of the parts shown in Fig. 1 are those which the parts preferably assume when the vehicle is at rest and under a normal load. Under such conditions it will be observed that the point of contact between the rocker 56 and the track 54 occurs at a point 72, and that the point of contact between the lower face of the rocker 56 and the pivoted member 58 occurs at 74, the point 74 being more advanced in the direction of length of the vehicle than the point 72. Accordingly, it will be observed that the force of the spring 66 tending to rotate the member 58 in a clockwise direction about the pivot pin 60 tends to urge the rocker 56 to fulcrum in a clockwise direction of rotation about the point 72 and thus force the wheel 42 downwardly with respect to the frame 40, or in other words to elevate the frame 40 with respect to the wheel 42.

Considering the parts to be in the relative positions indicated in Fig. 1 with the vehicle under a normal load, let it be assumed that an additional load is imposed on the vehicle. Under such circumstances the frame 40 will be pressed downwardly with an added force and will tend to rotate the rocker 56 in a counter-clockwise direction of rotation about the axis of the wheel 42, and actual movement of the frame 40 in this direction will necessarily occur. This downward movement of the frame 40, because of such added load, and consequent counter-clockwise direction of movement of the rocker 56 about the axis of the wheel 42 will cause the point of contact 72 between the rocker 56 and the track 54 to move rearwardly along the track 54, and at the same time this movement of the rocker 56 will cause the point of contact 74 between it and the member 58 to move forwardly on the member 58. The net effect of this movement of the rocker 56 is to further increase the distance, longitudinally of the vehicle, between the points 72 and 74, and thus permit the force of the spring 66 to act through a greater leverage in order to resist such movement of the rocker 56. At the same time, the leverage arm between the wheel 42 and the point of contact 72 between the rocker 56 and track 54 will decrease, thus rendering the force of the spring 66 more effective in resisting this rocking movement of the rocker 56. It will be observed that if the member 58 was eliminated and the spring 66 acted directly against the under-surface of the rocker 56, the action of the device would be substantially identical to that disclosed in my copending application first referred to above, but in such case the increased leverage due to an added load on the vehicle would result only from the shifting of the point 72, while in the present invention the added leverage is obtained by the simultaneous shifting of both points of contact 72 and 74 in opposite directions with respect to the length of the rocker, and in this respect the present invention involves a material advantage over the construction disclosed in my copending application first referred to.

An additional and more important advantage, however, is obtained in the present construction by the use of the member 58 and the relatively rockable contact between the member 58 and rocker 56. In this respect it will be understood that as far as the feature just described and the feature which will now be described are concerned, theoretically it makes no difference whether the lower surface of the rocker 56 or the upper surface of the member 58 is curved so as to obtain the desired rocking action between the rocker 56 and member 58. It will, however, usually be found more convenient to curve the lower surface of the rocker 56 as shown, and this is particularly true where the upper surface of the rocker 56 is curved as shown inasmuch as in such case the machining of curved surfaces may be limited to one member only.

It will be appreciated that with the construction shown in Fig. 1, as the rocker member 56 rotates in a counter-clockwise direction of rotation about the axis of the wheel 42 when an added load is imposed on the vehicle, and although the point at which the rocker 56 fulcrums on the track 54 is rearwardly of the point of rocking contact between the rocker 56 and member 58, because the forward end of the rocker 56 is forwardly and upwardly curved on its lower surface very little if any actual movement of the member 58 about its pivot pin 60 may occur. In other words, by suitably arranging the relative curvatures of the lower forward end of the rocker 56 and the upper forward end of the member 58 it is possible that rocking movement of the rocker 56 on the track 54 may occur during variations of load upon the vehicle and relative vertical movement between the frame 40 and wheel 42, without causing any actual pivotal movement of the member 58 in either direction. In such event it will be observed that the compressive force of the spring 66 will remain constant and the variation of force resisting rocking movement of the rocker 56 necessary to accommodate different loads upon the vehicle be taken care of solely by a variation in the leverage arm through which the force of the spring 66 acts upon the rocker 56 through the medium of the member 58, and the variation of leverage arm between the wheel center and point of contact of the rocker 56 with the track 54 through which such load acts in opposition to the force of the spring. On the other hand, the relative curvature between the forward lower face of the rocker 56 and the upper forward face of the member 58 may be so proportioned that the compressive force on the spring 66 may be either increased or decreased during the application of additional loads on the vehicle, and by controlling such relative curvature as well as the relative curvature of the upper surface of the rocker 56 and the track 54, any desired, progressively or otherwise, increasing or decreasing increments of movement between the frame 40 and axis of the wheel 42 may be obtained during uniformly increasing or decreasing increments of load upon the frame 40. Thus the present construction offers a wide variety of possibilities as respects movements between the frame and the wheel upon variations of load on the vehicle, and for the above described reasons it will be appreciated that the construction adapts itself to accommodate a wide variation in the load carried by the vehicle and yet retain its sensitivity to small variations in load over its entire range of load carrying movement. This fact is of extreme importance in enhancing the so-called desirable "riding characteristics" of a motor vehicle equipped with spring suspensions constructed in accordance with the present invention, and makes the use of shock absorbers of minimized importance in connection with the same.

However, should it be desired to snub the rebound characteristics of the construction, a bolt such as 76 may be pivotally secured to the rocker 56 rearwardly of its point of contact with the track 54 and be projected upwardly through the upper flange 50 where it may be provided with a coiled spring 78 surrounding the same and normally maintained under compression between the upper flange 50 and a washer 80 adjustably secured in position on the bolt 76 by means of a nut 82. The spring 78 is, of course, considerably less effective than the spring 66 and merely acts to snub or retard downward movement of the rear end of the rocker 56 relative to the frame 40 under those conditions of operation in which the frame 40 may tend to be thrown upwardly.

Because of the fact that the wheel 42 may be subjected to driving and/or braking torque during operation which would tend to move it longitudinally of the vehicle, it will be found necessary in most cases to provide some means for preventing relative longitudinal movement of the rocker 56 with respect to the frame 40. Any suitable means may be provided for this purpose such as the means shown in my copending applications hereinbefore referred to, but in the present instance, as a matter of illustration, such means takes the form of a transverse slot 84 in the rocker 56 and cooperating pin 86 projecting therethrough and secured at opposite ends in the plate 48 and the cover 52 respectively. Preferably an anti-friction roller 88 is provided on the pin 86 for actual contact with the walls of the slot 84 so as to eliminate any possibility of binding between the pin and the slot during rocking movement of the rocker 56.

In order to permit the wheel 42 to be raised, as for instance for the purpose of permitting the tire thereon to be changed, means may be provided for limiting rocking movement of the rocker 56 from its normal position in a clockwise direction of rotation about its point of contact with the track 54. This may be conveniently accomplished by making the lower face of the rocker 56 substantially flat as indicated so that as soon as the frame 40 is raised a predetermined distance above its normal position the lower face of the rocker 56 will contact against the rear end of the member 58 and thereby prevent further rotation of the rocker 56 in this direction. As soon as the above described contacting relation between the lower face of the rocker 56 and the rear end of the member 58 occurs further vertical movement of the frame 40 with respect to the ground will cause the wheel 42 to be positively raised with the frame 40 and thus enable it to be positioned in spaced relation to the ground.

It is also preferable to enclose the contactible surfaces between the rocker 56 and the track 54 and member 58 within a dust proof enclosure so as to maintain these surfaces free from foreign material and to maintain a properly lubricated condition thereof. The box-like structure already referred to including the plate 48, flanges 50 and cover 52 form such an enclosure for all except the rear end of the device in which the rear end of the rocker 58 is vertically movable. This end of the device, however, may be effectively closed against the entrance of dust, dirt or other foreign material by means of a flexible closure element such as 94, formed from fabric, rubberized fabric, rubber or other suitable material and sealed at its opposite ends to the box-like enclosure and to the rocker 56 respectively.

Side-sway between the wheels 42 and frame 40 is preferably prevented by making the rocker 56 of substantially the same thickness, measured in a horizontal direction perpendicular to the vehicle, as the corresponding interior dimensions of the enclosure consisting of the plate 48, flanges 50 and cover 52 so that the sides of the rocker 56 will contact with the plate 48 and cover 52 respectively and be guided thereby in its rocking movement. In the modifications of the present invention shown in the following figures of the drawings it will be understood that the box-like closure above described, the seal against dust and other foreign material, and the guiding of the rocker against lateral displacement during its rocking operation as described in connection with Fig. 1 may equally well be employed and this whether such means are shown or not, it being understood in this respect that the various illustrations herein are to be considered as more or less diagrammatic of the broader aspects of the present invention.

In Fig. 2 a construction is shown which is substantially identical to that shown in Fig. 1 except for two features. Consequently the parts are indicated in Fig. 2 by the same numerals as in Fig. 1 except such numerals bear the submark "a". In the construction shown in Fig. 2 the rear end of the rocker 56a instead of being rigidly fixed to the axle housing 46a, is provided with a rubber or other yieldable non-metallic sleeve 98 interposed between it and the axle housing 46a. This not only serves to deaden the transmission of shocks and/or vibrations between the axle housing 46a and rocker 56a but also permits a certain amount of twisting of the axle housing 46a with respect to the rocker 56a without imposing an undue twisting strain on the rocker 56a. In addition, a rubber or other resilient buffer 100 is interposed between the rear end of the track 54a and the cooperating surface of the rocker 56a to reduce the shock on the device and noise which would otherwise occur when the load imposed on the vehicle, either by gross weight or vertical shock, would otherwise be sufficient to cause sufficient rocking movement of the rocker 56a to bring the point of contact 72 between the rocker 56a and track 54a to the extreme rear end of the track.

In Fig. 3 a substantial modification of the above described construction is shown. In this modification the rocker 56b instead of having a true rocking contact with an extended track such as the track 54 previously described is pivotally mounted upon a pin 102 fixed with respect to the plate 48b and positioned intermediate the ends of the rocker 56b. A true rocking engagement does exist between the forward or right-hand end of the rocker 56b and the pivoted member 58b as in the previously described constructions. The spring 66b in cooperating between the rocker 56b and member 58b constantly urges the rocker 56b in a counter-clockwise direction of rotation about the pin 102 so as to elevate the frame 40b with respect to wheel 42b.

Figs. 4 and 5 show a modification of the present invention adapted to the independent suspension of the front wheels of a motor vehicle, the suspension for the left front wheel (viewed from the front of the vehicle) only being shown. In this modification the forward end of the chassis frame side rails 40c are fixed to a double walled cross-member 110 provided with end portions projecting outwardly beyond the corresponding side rail 40c with the front and rear surfaces thereof arranged in outwardly converging relationship. The forward wall of these outwardly projecting and converging end portions of the cross-member 110 serves the same purpose as the plate member 48 described in connection with Fig. 1 and its upper surface is forwardly flanged as at 50c to provide a track for the corresponding rocker 56b arranged for rocking movement in a vertical plane parallel with such forward end wall portion. A rocker 58c pivoted at 60c to such forward wall of the cross-member 110 is spring pressed against the lower edge of the rocker 56c by means of a spring 66c and acts in substantially the same manner as the pivoted member 58 first above described in tending to urge the wheel 42c downwardly with respect to the frame. The outer end of each rocker 56c is preferably bifurcated and is pivotally connected at 112 to a sleeve member 114 received therein. A similar sleeve member 116 is positioned in vertical alignment with the sleeve 114 and is pivotally connected by means of a pin 118 to the outer end of a corresponding pair of inwardly diverging links 120 pivotally connected at their inner ends to bolt or pin means 122 secured in the cross-member 110 adjacent the corresponding frame side member 40c. A steering knuckle 124, upon which the wheel 42 is rotatably mounted in accordance with conventional practice, is pivotally mounted between the sleeves 114 and 116 on the king bolt 128 for movement about an approximately vertical axis.

As will be apparent, in the construction shown in Figs. 4 and 5 the spring suspension means reacts to variations in load upon the vehicle in substantially the same manner as the constructions shown in Figs. 1 and 2. The arm 56c and link 120, together with a king bolt 128 forming the pivotal connection between the sleeves 114 and 118 and the steering knuckle 124 serve to maintain the wheel 42c in its desired vertical plane during movement thereof relative to the frame, and the diverging relation of the links 120 serves to maintain the wheel against relative forward or rearward movement with respect to the frame. An arm 130 fixed with respect to the knuckle 124 may be connected to any suitable or conventional steering mechanism for controlling the steerable position of the wheel 42. As will be observed this construction provides all of the advantages described in the present invention in connection with the construction shown in Fig. 1 and at the same time permits steering movement of the wheels to control the direction of travel of the vehicle. It will also be appreciated that this construction provides for movement of one of the steering wheels 42c under variations in load or road surface conditions without affecting the position of the other steering wheel in any respect whatever, and thus all of the advantages of independently sprung steering wheels are obtained together with the previously described advantages inherent in the present invention.

In Fig. 6 another modification of the present invention applied to the front or steering road wheels of a motor vehicle is illustrated, but in this construction the suspension of one of the wheels 42d is not independent of the suspension of the other as in the construction illustrated in Figs. 4 and 5. The reason for this is that in the construction illustrated in Fig. 5 the steering knuckles 124d are mounted upon the ends of a conventional front axle 136 in a conventional manner. In this instance the vehicle chassis frame is provided with a transverse cross-member 138 provided with a forwardly projecting flange 140 at its upper edge, the lower surface of which forms a track 54d serving the same purpose as the track 54 previously described. A transversely extending rocker 56d is disposed at each side of the cross-member 138 in contact with the track 54d and the outer end of each rocker 56d is pivotally connected at 142 to a shackle 144 in turn pivotally connected at 146 to an upwardly projecting bracket 148 fixed with respect to the axle 136. In this case instead of employing a pivoted member such as the members 58 previously described for rocking engagement with the lower face of the rockers 56d, a bodily vertically movable member 150 serving the same purpose is employed, it being carried upon a vertically extending rod 152 extending upwardly through the flange 140 and provided with a coiled spring 66d surrounding it and maintained under compression between the washer 68d thereon and the flange 140. The member 150 rockably engages the lower edges of both of the rockers 56d and consequently the member 150, rod 152 and spring 66d serve in this instance the identical purpose and function of the member 58, bolt 62 and spring 66 in the construction illustrated in Fig. 1. It will be observed that during rocking movement of the rockers 56d bodily movement of the member 150 may occur where the rocking relation between it and the lower surface of the rockers 56d are such as to require such movement.

In Fig. 7 a further modification of the present invention applied to the independent suspension of the steering road wheels of a motor vehicle is shown. In this case a box-like structure 160 provided with a removable cover 162 is fixed to the side of the chassis frame side member 40e. Adjacent the upper and lower margins of the box 160 adjacent the forward end thereof are fixed two bracket members 164 between which a vertically directed splined shaft 166 is rotatably mounted but held against relative axial movement therein. Within the box 160 and in the upper portion thereof is a rocker member 56e pivoted for movement about the transverse pin 168 secured in the box 160 and cover 162 thereof. A second rocker member 58e is disposed below the rocker 56e and in rocking engagement therewith. The forward end of the rocker 58e is pivoted upon a pin 170 which projects out through a slot 172 in the cover 162 and is provided with an end 174 which rotatably surrounds the splined shaft 166. A spindle 176 upon which the wheel 42e is adapted to be rotatably mounted is provided with a yoked inner end which straddles the end 174 of the pin 170 in relatively closely fitting relation axially of the splined shaft 166, and such yoked end non-rotatably but slidably engages the splined shaft 166. Because of this construction turning of the splined shaft 166, which may be accomplished through the steering arm 178 connected to any suitable or conventional steering mechanism, will cause a similar movement of the spindle 176 about the axis of the splined shaft 166 and will effect corresponding steering movement of the wheel 42e thereby. At the same time because of the sliding engagement of the yoked end of the spindle 176 with the splined shaft 166, the spindle may move vertically with respect to the frame 40e in a manner which will hereinafter be more fully described.

To the upper surface of the rocker 56e a leaf spring member 54e is secured at one end by means of the screw 180. The leaf spring 54e extends outwardly toward the free end of the rocker 56e and curves upwardly away from the upper surface thereof in such direction. A bolt 62e passes through the outer free ends of the leaf spring 54e, freely through the outer end of the rocker 56e and through the end of the rocker 58e, and the end thereof projecting below the latter rocker is there provided with a compression spring 66e. The force of the spring 66e acts through the bolt 62e to urge the outer ends of the leaf spring 54e and rockers 56e and 58e toward each other, tending to rock the rocker 56e in a clockwise direction of rotation and the rocker 58e in a counterclockwise direction of rotation. It will be appreciated that the force of the spring 66e in thus urging the rockers 56e and 58e in the direction mentioned will tend to separate the pivoted ends of these rockers and consequently will urge the frame 40e upwardly with respect to the axis of the wheel 42e. The leaf spring 54e in yielding under variations of load imposed on the vehicle will not only aid in supplementing the action of the spring 66e, but the action between the leaf spring 54e and the upper surface of the rocker 56e will be somewhat similar to the rocking engagement between the rocker 56 and track 54 in the construction illustrated in Fig. 1. In this construction it will be observed that variations of load upon the vehicle in effecting rocking action between the rockers 56e and 58e will vary the leverage arm through which the force of the spring 66e tends to resist or cause rocking movement of the rocker 58e. In other words, as an additional load is imposed upon the vehicle the wheel spindle 176 and consequently the pin 170 serving as a pivot for the rocker 58e will move vertically toward the pin 168 and the fulcrum point or point of contact between the rockers 56e and 58e will move to the left as viewed in Fig. 7 thus increasing the leverage arm through which the force of the spring 66e acts and decreasing the leverage arm through which the weight of the vehicle transmitted to the wheel acts. In this manner the same general result as obtained in the constructions previously described is also obtained in this modification.

In Figs. 7 and 8 a coiled spring 182 is shown surrounding the splined shaft 166 below the yoked end of the spindle 176. Spring 182 serves merely as a snubbing spring in the rebound movements of the wheel 42e and ordinarily will be effective only when the spindle 176 approaches its lowermost position of movement. Any suitable or conventional form of sliding plate 184 or other closure may be provided for the slot 172 in the cover 162 so as to prevent the entrance of foreign material into the interior of the box 160 and also to maintain a suitable supply of lubricant within the box. It may also be noted that the construction illustrated in Figs. 7 and 8, as well as the constructions illustrated in Figs. 1, 2 and 3 and in the majority of modified structures hereinafter described, may be made of a unitary construction and be applied to and removed from the vehicle as a unit.

A substantial modification of the invention is also shown in Fig. 9. In this case a bar member 200 is pivotally connected at its forward end at 202 to a bracket 204 fixed with respect to the vehicle chassis frame side rail 40f. At its rear end the bar member 200 is provided with a bracket 206 secured to the axle housing for the wheel 42f. A rocker member 208 rests upon the rearward portion of the upper surface of the bar member 200 and projects rearwardly therefrom and at its rear end is pivotally connected by means of a link 210 with a bracket 212 fixed to the frame side member 40f. Adjacent its rear end the bar member 200 is provided on opposite sides with a pair of upwardly extending brackets 214 straddling the rocker 208 and pivotally mounted at 216 between the upper ends of the bracket 214 is a bar member 218 projecting forwardly therefrom in rockable engagement with the forward end of the rocker 208. A bolt 62f projects through the bar member 218, rocker 208 and bar member 200 and on that end thereof projecting below the bar member 200 is provided with a coil spring 66f serving the same function as the spring 66 previously described and urging the members 200 and 218 and the rocker 208 toward one limit of their movable position and particularly urging the bar member 200 and rocker 208 toward a relative position tending to raise the frame 40f with respect to the wheel 42f. The member 218 serves the same function as the member 58 in Fig. 1 and the bar member 200 serves the same purpose as the upper flange 50 providing the track 54 in Fig. 1. The main difference in this construction is that the track member instead of being fixed with respect to the frame is pivoted with respect thereto and the wheel is secured to the free end of the member 200 instead of to the cooperating rocker. The net effect of the construction, however, is substantially similar to that in the previously described structures.

It will be noted in Fig. 9 that the free end of the member 218 is adapted to contact the member 200 when the vehicle is under a slightly less than normal load and that the force of the spring 66f becomes ineffective when such contact occurs. Further movement of the wheel 42f downwardly with respect to the frame 40f under such condition, which would be a rebound condition, is thus prevented, which permits the rebound spring 78f to become more fully effective in checking such rebound.

In Fig. 10 a construction is shown which is very similar to the construction shown in Fig. 9, the primary difference being that the asembly is inclined upwardly and forwardly with respect to the direction of travel and the member 218g is so related with respect to the rocker 208g that it will not contact the bar member 200g under any operating condition. The various parts thereof carry the same numerals as in Fig. 9 except that such numerals bear the sub-letter "g" and, accordingly, the construction and operation of the device will be apparent without further description of the same.

In Fig. 11 a still further modified form of construction is shown. In this construction a plate member 48h is shown secured to the sides of the vehicle chassis frame side rail 40h and as provided with a laterally projecting flange 50h at its upper edge providing on the underside thereof a track 54h against which the rocker 56h is adapted to rock. Instead of mounting the wheel 42h on the rocker 56h, in accordance with the construction illustrated in Fig. 1 for instance, in this case the bar member 58h, which is rockably associated with the lower edge of the rocker 56h, extends rearwardly therefrom and is secured to the axle housing for the wheel 42h. In the particular case shown the track 54h and the upper surface of the bar 58h against which the rocker 56h bears are straight while the upper and lower surfaces of the rocker 56h are curved, it being understood, however, that this relation of these surfaces may be modified or changed as desired so long as the desired rocking action between all of these parts is obtained.

A bolt 230 is pivotally connected at its lower end to the forward end of the rocker 56h and projects upwardly through the flange 50h where it receives the coiled compression spring 232 maintained under compression between the washer 234 and the flange 50h. As will be observed the force of the spring 232 constantly tends to rock the rocker 68h in a clockwise direction of movement around its point of contact 72h with the track 54h. A second bolt 236 pivoted at its upper end to the rocker 56h projects down through the forward end of the bar member 58h and is provided with a similar coiled spring 238 opposing rocking movement of the rocker 56h under the force of the spring 232, and at the same time tending to rock the bar member 58h in a clockwise direction of rotation about its point of contact 74h with the rocker 56h. It will be observed that the force of both springs 232 and 238 cooperate with one another to urge the bar member 58h in the last described direction of rocking movement with respect to the rocker 56h and consequently to raise the frame 40h with respect to the wheel 42h. The resulting rocking action of both the rocker 56h and bar member 58h, however, will have the same net result as the constructions previously described in the suspension of the vehicle load as will be readily understood by those skilled in the art. It may be noted, however, before leaving the description of this construction, that some means are preferably employed for preventing relative longitudinal movement of the wheel 42h with respect to the frame 40h and although any suitable means may be employed for this purpose the particular means shown in Fig. 11 consists of a lug 240 projecting upwardly from the upper face of the bar member 58 and fitting within a socket or recess 242 in the lower face of the rocker 56h, and which prevents any relative longitudinal movement between the rocker 56h and bar member 58h without interfering with the proper rocking action between them. This particular feature of the construction is more fully shown and described in my co-pending application Serial No. 54,636 above described. The inter-engagement of the pin 86h and slot 84h will, of course, prevent relative longitudinal movement of the rocker 56h with respect to the frame 40h as previously described.

In Fig. 12 a modification of the present invention is shown applied to a vehicle wheel suspension including the usual type of multiple leaf spring 250 as shown. In this case the forward end of the spring 250 which is secured to the axle for the wheel 42i in the usual manner is pivotally connected by means of a pin 252 to a bracket 254 fixed to the frame 40i in a conventional manner. Instead of employing the usual shackle between the rear end of the spring 250 and the frame 40i, such shackle in the present case is replaced by a construction by means of which certain advantages of the present invention are obtained. In such case the upper surface of the upper main leaf of the spring assembly 250 serves the same purpose as the tracks 54 previously described and the rocker member 56i rests directly upon it, the rear end of the rocker 56i being pivotally connected with the frame 40i by means of a shackle 256. The bar member 58i in this instance contacts against the upper surface of the rocker 56i and it is pivotally connected at its rear end to a bracket 258 secured to the frame 40i. The compression coil spring 66i cooperates with the bolt 62i, spring 250, rocker 56i and member 58i in a manner similar to the previously described constructions to constantly urge the frame 40i upwardly with respect to the wheel 42i. In this instance a rubber or other resilient block 260 is provided on the spring 250 for contact with the free end of the bar member 58i under rebound conditions. With this construction the force of the spring 66i may be such that the rocker 56i and member 58i will function in their resilient support of the vehicle before the main spring 250 becomes fully effective and thereby serve to principally support light loads on the vehicle and as a shock absorber, this being particularly important in connection with motor vehicles of the truck type although equally applicable to vehicles of the passenger carrying type. On the other hand it will be appreciated that the spring 66i may be made of sufficient strength so that the rocker 56i and member 58i become effective only after the maximum load for which the spring 250 has been designed has been applied to the vehicle and so as to supplement the action of the spring 250 in this respect. On the other hand the spring 66i may be of sufficient force to render the action of the device effective throughout the effective range of the spring 250 so as to actively supplement such action of the main spring during normal loads.

In Fig. 13 a modification of the construction shown in Fig. 12 is illustrated. In this case, however, the rocker 56j is pivotally connected at 264 with the rear end of the spring 250j, the usual spring eye being employed for such purpose. The arrangement of the rocker 56j in this case is, however, such that it may have a relative rocking action on the upper surface of the upper main leaf spring 250j upon application of load to the vehicle by causing a bending of such end of the main leaf. The member 58j in this case is provided with a curved lower face for the rocking engagement with the upper curved face of the rocker 56j and is pivotally connected to the frame 40j at 266. The spring 66j cooperates with the bolt 62j passing through the rocker 56j, member 58j and spring 250j to constantly urge the members 56j and 58j toward a relatively rockable position which will elevate the frame 40j with respect to the cooperating wheel (not shown). It will be appreciated that this construction functions in a manner somewhat similar to that illustrated in Fig. 12.

In Fig. 14 a modified form of construction is shown including a plate member 48k secured to the side face of the chassis frame side rail 40k and provided with laterally projecting marginal flanges 50k around its entire perimeter. A rocker 270 fully positioned within the area enclosed by the flanges 50k is pivoted to the plate member 48k at 272. A second rocker 274 also positioned within the area outlined by the flanges 50k is located below the rocker 270 and in rocking contact therewith. Its rear end is secured to the axle housing for the wheel 42k and such axle housing projects through the box formed by the plate 48k, flanges 50k and cover 52k therefor and is vertically movable therein through the slot 276 provided for the purpose. A bar member 278 having a fixed pivot 280 lies in rocking engagement with the upper surface of the free end of the rocker 270 and a bolt 282 projecting through the members 270, 274 and 278 is provided with a coiled spring 66k which serves to constantly urge the rocker 274 toward a rockable position such as to elevate the frame 40k with respect to the wheel 42k. It will be observed that with this construction all of the operative parts of the device are confined within the box-like structure which prevents the entrance of dirt, dust or other foreign material and maintains a suitable supply of lubricant therein. Sliding plates such as the plates 184 illustrated in Fig. 8 may, of course, be employed for closing the slot 276 without restricting the desired vertical movement of the rear end of the rocker 274 therein.

In Fig. 15 is illustrated a construction which is similar in principle to the construction illustrated in Fig. 1 except that the rocker member 56m, instead of being curved on its upper and lower surfaces, is made straight, the curvature required for the desired rocking movement being provided on the cooperating members. In the particular case shown the lower face of the frame 40m is formed to provide a curved rocking face 290 against which the straight upper face of the rocker 56m is adapted to contact and upon which it is adapted to rock. A bracket 292 projects downwardly from the frame 40m and to its lower end is pivoted at 294 the bar member 58m and is constantly urged upwardly into contact with the lower face of the rocker 56m by means of the spring 66m. The axle housing for the wheel is secured to the rear end of the rocker 56m. As will be readily understood from the foregoing description the function and operation of the construction shown in Fig. 15 will be substantially identical to that shown in Fig. 1.

In Figs. 16 and 17 a construction is shown in which the frame side member 40n of the vehicle chassis frame is formed to provide both a track for the rocker 56n and as a closure for the parts. The frame 40n in this instance is of U-shaped section but with the mouth of the U opening downwardly. The rocker 56n is received between the opposite sides of the U and enclosed thereby except at its rear end which projects outwardly therefrom at the kicked up portion of the frame and is connected to the axle housing for the wheel 42n. The bar member 58n which is fully enclosed between the sides of the member 40n is pivotally connected at its rear end to the frame 40n and the force of the coil spring 66n acts between its forward free end and the upper face of the frame 40n to constantly urge the rocker 56n toward a position to elevate the frame with respect to the wheel. The function and operation of the construction shown in Fig. 16 will obviously be substantially identical to that illustrated in connection with Fig. 1, the main difference being that no separate box-like structure is employed and the sides of the side frame member 40n cooperate with the sides of the rocker 56n as illustrated in Fig. 17 to guide the rocker 56n in vertical movement and to prevent the sidesway between the frame and the wheels.

In Fig. 18, in order to illustrate the application of the present invention to devices other than wheel suspensions of motor vehicles and to illustrate one of the many different arts to which the present invention is applicable, an application on the same to a buffer for use in connection with cooperating ends of railway cars or the like is shown. It will be understood that such buffers are commonly employed in European railway practice between the outer edges of adjacent ends of cars. In Fig. 18 a member 300 is shown which is adapted to be fixed with respect to the outer end surface of a railway car, and centrally positioned with respect thereto and projecting outwardly therefrom in the direction of the length of the railway car is a buffer indicated generally at 302 adapted to contact with a similar buffer 302 on an adjacent railway car in service. The buffer 302 is provided with a shank 304 to which the inner ends of a pair of rockers 56p are pivotally connected as at 306. A pair of bracket members 308 project outwardly from the member 300 in straddling relation with respect to each of the rockers 56p and the outer ends of the brackets 308 are each slotted as at 310 for reception of the pivot member 312 of the corresponding member 58p. A coiled spring 66p and cooperating bolt 62p are provided between each cooperating member 58p, rocker 56p and the member 300 to constantly urge the rockers 56p in a direction to project the buffer 302 outwardly away from the member 300. A recoil check spring 78p surrounding a bolt 314 pivotally connected to the shank 304 of the buffer and projecting through the member 300 may be provided for checking the rebound actions of the buffer 302 if desired. As will be observed the action of this construction as regards loads imposed upon the buffer 302 acting toward the member 300 will be similar to the action of the constructions previously described in connection with wheel suspensions, one difference being apparent in this construction, however, in that the pivotal supports for the ends of the members 58p are free to shift longitudinally of the corresponding slots 310 during movement of the device in order to accommodate a greater axial movement of the buffer 302, the spring 66p in such case constantly urging the pivots 312 toward one limit of movement in the corresponding slots 310.

Although as a matter of illustration in all of the previously described views the contacting faces between the various rocking members have been shown as flat faces, it will be readily understood that this is not essential to the present invention and that such contacting faces may be of any desired cross-sectional configuration and that in many cases, particularly to maintain the properly aligned relation between the rockable members and to assist in preventing lateral movement between them, the contacting faces may be formed to a special configuration to attain this end. For instance in Fig. 19 a member 320 is shown which provides a track 322 on its lower face, in order to function in a manner similar to the track 54 previously described for cooperation with the upper surface of a rocker member 324 corresponding in function and operation to the rocker 56 previously described. In this case the track 322 in section is more or less of a V formation, the cooperating face of the track 324 being complementarily formed for cooperation therewith, and the sides of the rocker 324 being extended outwardly beyond the sides of the member 320 and formed to bear against the side edges thereof. In Fig. 20 the member 326 corresponds to the member 320 in Fig. 19 and is provided with a track face 328, corresponding to the track 54 and 322 previously described against which the complementarily formed face of a rocker member 330, functioning in the same manner as the rockers 56 previously described, is adapted to cooperate. In this particular instance the track 328 in section is formed to represent a part of the circuit thus obtaining a result similar to the construction illustrated in Fig. 19. Obviously other similar variations in section of the track and cooperating face of the rocking member may be employed.

Formal changes may be made in the specific embodiments of the invention described without departing from the spirit or substance of the broad invention, the scope of which is commensurate with the appended claims.

What I claim is:

1. In combination with a pair of relatively movable parts, a pair of members rockably engaging each other and respectively secured to the respective said parts, a third member rockably engaging one of said members, and spring means cooperating with said third member to urge said pair of members toward one limit of their relative rockable positions, the construction and arrangement of said members and said spring means being such that the distance between the points of engagement of said one of said members with the other of said members and with said third member varies upon relative movement of said movable parts.

2. In combination with a pair of relatively movable parts, a pair of relatively movable members at least one of which is connected to one of said parts, a third member pivotally connected to the other of said parts and rockably engaging both of said pair of members, said third member engaging said first member intermediate its point of engagement with said second member and its point of pivotal connection with the other of said parts, and spring means coacting between said parts whereby to urge said third member pair of parts toward one limit of its rockable position relative to said pair of members.

3. The combination with a pair of relatively movable parts, a track fixed with respect to one of said parts, a member pivotally secured to the other of said parts and rockably engaging said track, a second member rockably engaging the first mentioned member, and spring means urging said second member into contact with the first mentioned member whereby to urge said first mentioned member toward one limit of its rockable position relative to said track, the construction and arrangement of said members and said spring means being such that the distance between the points of engagement of said first mentioned member with said track and with said second member varies upon relative movement of said movable parts.

4. The combination with a pair of relatively movable parts, a track secured to one of said parts, a member pivotally secured to the other of said parts and rockably engaging said track, a second member carried by the first mentioned part and rockably engaging the first mentioned member, and spring means constantly urging said second member toward said first mentioned member whereby to constantly urge said first mentioned member toward one limit of its rockable position relative to said track, the construction and arrangement of said members and said spring means being such that the distance between the points of engagement of said first mentioned member with said track and with said second member varies upon relative movement of said movable parts.

5. In a motor vehicle having a frame and a road wheel, in combination, a track fixed with respect to said frame, a member secured relative to said road wheel and rockably associated with said track, a second member rockably associated with the first mentioned member and pivotally mounted relative to said frame, and spring means constantly urging said second member toward a position to rock the first mentioned member towards one limit of its rockable position with respect to said track.

6. In a motor vehicle having a chassis frame and a road wheel, in combination, a track fixed relative to said frame, a wheel supporting member secured at one end relative to said wheel and rockably associated with said track, a member pivotally mounted relative to said frame and rockably associated with the first mentioned member, and spring means cooperating between the free end of the second mentioned member and said frame constantly urging said second member in one direction of rotation about its pivotal axis, said track and members being so constructed and arranged that the force of said spring acting on said second mentioned member constantly urges the first mentioned member toward one limit of its rockable position relative to said track.

7. In combination with a pair of relatively movable parts, a pair of members rockably engaging each other and respectively secured to the respective said parts, a third member rockably engaging one of said members, and spring means cooperating with said third member to urge said pair of members toward one limit of their relative rockable positions, the rockable engagement between all of said members being so constructed and arranged that relative rocking movement between them varies the leverage arm of the force of said spring upon one of them without materially varying the compressive stress within said spring.

8. In combination a motor vehicle having a chassis frame and a road wheel, a track fixed with respect to said frame and extending transversely with respect to the length of said frame, a member rockably associated with said track, means rockably associated with said member constantly urging said member toward one limit of its relative rockable position with respect to said track, a pair of link members pivotally connected relative to said frame and extending in converging relation outwardly therefrom in vertically spaced relation with respect to said member, means interconnecting the outer ends of said link and said member, a steering knuckle pivotally mounted on said means, and said wheel being rotatably mounted on said steering knuckle.

9. In combination with a motor vehicle having a chassis frame and a road wheel, said frame having a substantially flat planular track fixed with respect thereto, a member having a curved upper and lower surface contacting said track with its upper surface and secured relative to said wheel, a second member pivoted with respect to said frame and bearing against the lower face of the first mentioned member, and spring means constantly urging said second member against the first mentioned member.

10. The combination with a pair of relatively movable parts, a track secured to one of said parts, an elongated member pivotally secured adjacent one of its ends to the other of said parts and rockably engaging said track intermediate its ends, a second elongated member pivotally secured adjacent one of its ends to said first mentioned part and rockably engaging said first mentioned member at a point beyond the point of engagement of said first mentioned member with said track, and spring means engaging the free end of said second named member constantly urging said second named member towards said first mentioned member toward one limit of its rockable position relative to said track, the construction and arrangement of said members and said spring means being such that the distance between the points of engagement of said first mentioned member with said track and with said second member varies upon relative movement of said movable parts.

BØRGE MARTINS.

CERTIFICATE OF CORRECTION.

Patent No. 2,125,512.                                          August 2, 1938.

BØRGE MARTINS.

It is hereby certified that error appears in the printed specification of the above numbered patent requiring correction as follows: Page 5, first column, line 37, before "vehicle" insert the words length of the; and that the said Letters Patent should be read with this correction therein that the same may conform to the record of the case in the Patent Office.

Signed and sealed this 20th day of September, A. D. 1938.

Henry Van Arsdale (Seal)                                       Acting Commissioner of Patents.